(12) United States Patent
Haverty

(10) Patent No.: US 6,484,258 B1
(45) Date of Patent: Nov. 19, 2002

(54) ACCESS CONTROL USING ATTRIBUTES CONTAINED WITHIN PUBLIC KEY CERTIFICATES

(75) Inventor: Rand Haverty, Ottawa (CA)

(73) Assignee: Kyber Pass Corporation, Nepean (CA)

( * ) Notice: Subject to any disclaimer, the term of this patent is extended or adjusted under 35 U.S.C. 154(b) by 0 days.

(21) Appl. No.: 09/132,672

(22) Filed: Aug. 12, 1998

(51) Int. Cl.[7] .................................................. H04L 9/00
(52) U.S. Cl. ..................... 713/155; 713/168; 713/182
(58) Field of Search .............................. 713/200, 201, 713/154, 155, 156, 164, 165, 166, 182, 185; 709/229, 217

(56) References Cited

U.S. PATENT DOCUMENTS

| | | | | |
|---|---|---|---|---|
| 5,339,403 A | * | 8/1994 | Parker | 711/221 |
| 5,586,260 A | | 12/1996 | Hu | |
| 5,699,513 A | * | 12/1997 | Feigen et al. | 713/201 |
| 5,720,035 A | * | 2/1998 | Allegre et al. | 709/225 |
| 5,815,574 A | * | 9/1998 | Fortinsky | 713/153 |
| 5,991,810 A | * | 11/1999 | Shapiro et al. | 709/229 |
| 6,003,084 A | * | 12/1999 | Green et al. | 709/227 |
| 6,088,805 A | * | 7/2000 | Davis et al. | 713/202 |

FOREIGN PATENT DOCUMENTS

| EP | WO98 23062 | 5/1998 |
|---|---|---|

OTHER PUBLICATIONS

R. Haverty, *Strong Authentication Servers Electronic Peep-Holes*, The Canadian, Fall 1996, pp. 7–10.

Pays, et al., "An intermediation and payment system technology" 1996—vol. 28, No. 11, pp. 1197–1206.

Anderson, et al., "Sessioneer: flexible session level authentication with off the shelf servers and clients" 1995—vol. 27, No. 6, pp. 1047–1053.

Garfinkel, S., "Web Security & Commerce", Jun. 1997, p. 151.

* cited by examiner

*Primary Examiner*—Matthew Smithers
(74) *Attorney, Agent, or Firm*—Sughrue Mion, PLLC

(57) ABSTRACT

In Public Key Infrastructure ("PKI") applications, a key pair (public key and private key) is used to provide strong authentication and encryption services. The key pair is associated with the user by the use of a "certificate," which contains the user's public key as well as attributes associated with that user. This invention relates to the use of these attributes to control the access to a protected resource given to authenticated users. The attributes within a user's public key certificate are filtered by an attribute filter referenced by the proxy definition in order to control access to a protected resource. Further limitation of access to a protected resource is accomplished by association with server input and output addresses.

33 Claims, 6 Drawing Sheets

Fig. 3

| Certificate Number | User Name | Public Key |
|---|---|---|
| 1 | User_1 | PubKey_1 |
| 2 | User_2 | PubKey_2 |
| 3 | User_3 | PubKey_3 |
| 4 | User_4 | PubKey_4 |
| n | User_n | PubKey_n |

ACCESS CONTROL USING ATTRIBUTES CONTAINED WITHIN PUBLIC KEY CERTIFICATES

BACKGROUND OF THE INVENTION

1. Field of the Invention

This invention relates to a method of controlling access to a protected resource based on user attributes contained within public key certificates and proxy definitions. This invention also relates to a program product bearing software, which controls access to a protected resource based on user attributes contained in public key certificates and proxy definitions. This invention further relates to a computer system that operates to control access to a protected resource based on user attributes contained in public key certificates and proxy definitions.

2. Related Art

Before the advent of Public Key Infrastructure ("PKI") technology, several techniques evolved to control the access of users to protected computer resources, such as corporate servers executing transactional programs or hosting databases. One method of protection was to prevent unauthorized access to the protected computer system by physical means. The simplest of these methods was to limit access to terminals communicating with the protected computer system. Another method was to prevent unauthorized access by not permitted physical network connections to exist between the protected computer system and public computer networks. Another method of protection was to implement automated access control systems on each protected computer system or protected server. While effective, these techniques have serious shortcomings that inhibit the effective use of computer resources. In the case of physical security methods, the opportunity to capitalize on the use of public networks, such as the Internet, to access protected computer systems is lost. Similarly, automated access control systems implemented at the server level are applicable only for that particular server. Consequently, the administration of access control privileges may have to be duplicated amongst several servers, which in turn leads to errors, inconsistencies, and ultimately, increased costs.

To take advantage of public networks such as the Internet and corporate Intranets, industry has adopted the security server approach to implement security measures. A security server is interposed between the protected computer resource and the client station, acting as the sole link between the resource and the client. The client can be directly connected to the security server, or it may be linked to the security server via one or more communications routers. In addition, the security server may protect single or multiple resources. The security server will establish a communications link between the protected resource and the client station if and only if the user is properly authenticated. The term "security server," in this sense, encompasses security servers, firewalls, proxy servers and authentication servers. In addition, the term "protected resource" includes but is not limited to database servers, applications servers and transactional servers.

Coupled with the security server approach is Public Key Infrastructure technology. In PKI applications, a key pair (public key and private key) is used to provide strong authentication and encryption services. The key pair is associated with the user by the use of a "certificate" containing the user's public key, as well as attributes associated with that user. The security server establishes a link between a client station (or a communications router) and a protected resource by establishing a proxy. This proxy is activated only if the client station is properly authenticated. Typically, this client station authentication is based on submission of the correct password in order for the client station to access its private key, and on possession of the actual private key.

SUMMARY OF THE INVENTION

This invention relates to a method of adding an access control function in the security server based on attributes stored in public key certificates. Any attribute stored in the public key certificate may be used to control access to a protected resource via a security server.

According to the invention, a novel approach of granting or denying access through the security server is based on the value of an attribute. The method of the invention is such that a condition based on the value of an attribute is associated directly with the proxy in the security server. The proxy between a client station and a protected resource is established if and only if the requestor is authenticated, and the attribute condition associated with that proxy is satisfied.

According to the invention, a novel approach of limiting access to a protected resource through a security server is based upon the input and output addresses associated with a proxy definition. The method of invention is such that a condition based on the addresses can limit access only to a specific resource.

BRIEF DESCRIPTION OF THE DRAWING FIGURES

FIG. 3 illustrates the correlation between user and the public key certificates identified with that particular user.

DETAILED DESCRIPTION OF THE PREFERRED EMBODIMENTS

The presently preferred embodiments of the invention will now be described, first with respect to a client station accessing the protected resource(s) from an internal network, such as an Intranet. Afterward, the invention will be described with respect to a client station accessing the protected resource(s) from an external network, such as the Internet, or other such public networks. These two presently preferred embodiments will serve to demonstrate and to teach the invention not only in two specific applications, but in its most general sense as being applicable to a wide variety of other environments.

The Security Server Approach

Figure 1:
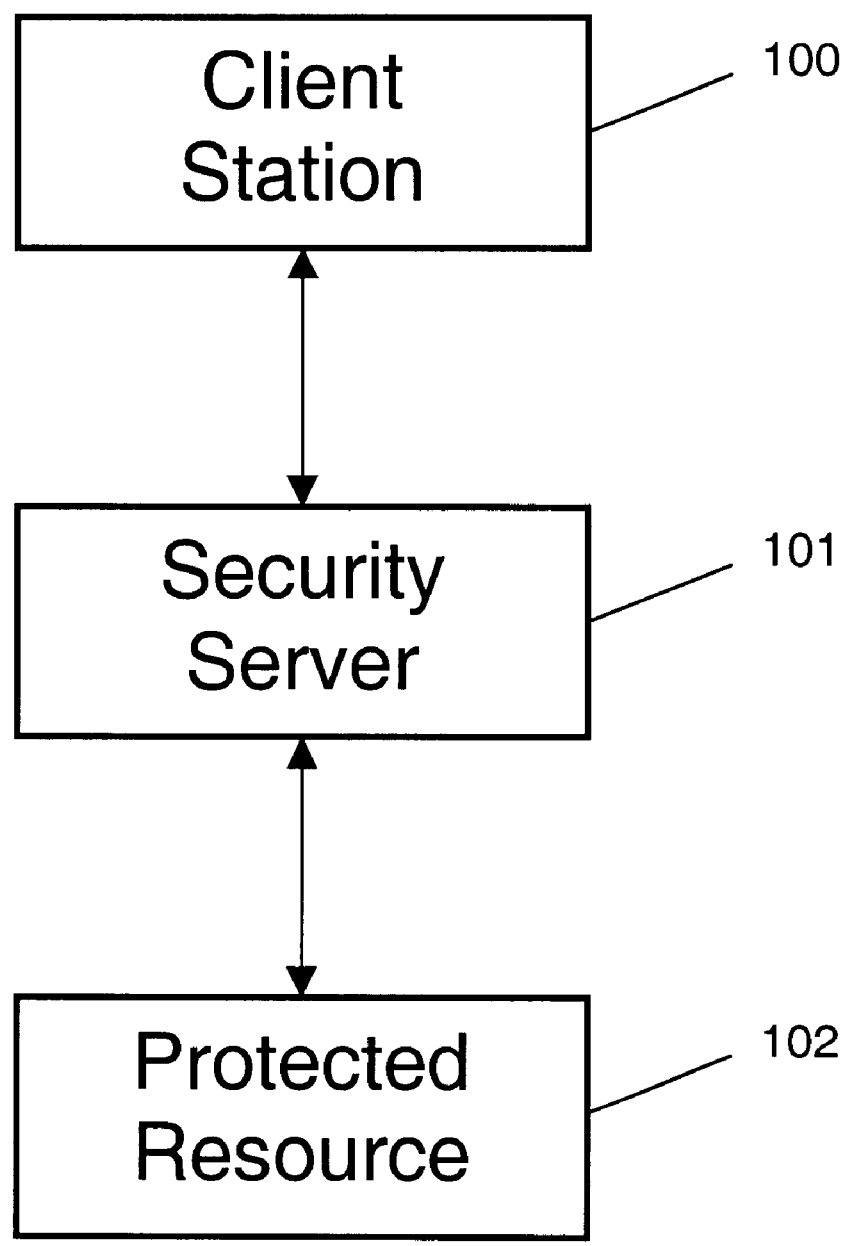
FIG. 1 illustrates a typical computer network that uses a security server to limit access from a client station to a protected resource.

The security server approach is shown in very simplified form in FIG. 1. Reference numeral 100 indicates a client station. A client station 100 may be understood to be a process that executes on a general purpose or specialized computer system. A client station 100, as a process, can represent a user desiring to perform a task with respect to an application on a protected resource.

In FIG. 1, reference numeral 101 represents a security server, and reference numeral 102 represents a protected resource. As seen in FIG. 1, no direct communications link exists between the client station 100 and the protected resource 102. Security server 101 may be understood to be a process that runs on a general purpose or specialized computer system. Likewise, protected resource 102 may be understood to be a process.

A user desiring to access the protected resource 102 must do so from his client station 100 via security server 101. Users authorized to access the protected resource 102 are authenticated by the security server 101, and are thus allowed to utilize the protected resource 102. Security server 101 prevents unauthorized users from accessing the protected resource 102.

Figure 2:
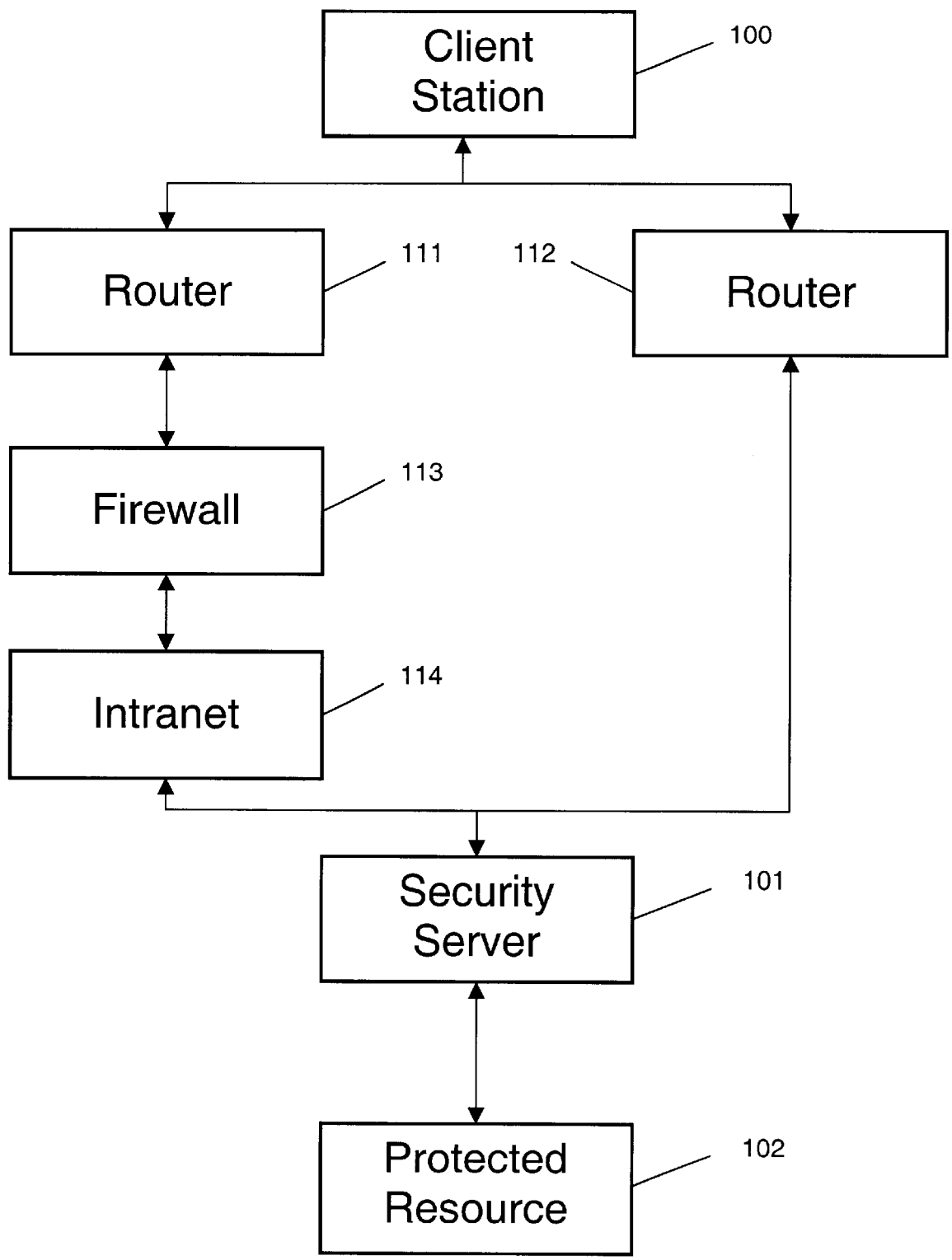
FIG. 2 illustrates a more sophisticated computer system network that incorporates features typically found on large multi-user systems.

FIG. 2 illustrates a more sophisticated computer network, and one more likely to be found in today's current environment. A client station 100 has two pathways by which it can reach the protected resource 102.

The most direct route involves establishing a connection via a communications router 112 to the security server 101. One the user has been properly authenticated by the security server 101, access is granted to the protected resource 102 via proxy. The only role of communications router 112 is to facilitate the connection between the client station 100 and the security server 101.

Another route involves establishing a connection via a communications router 111 to a firewall 113. The firewall 113 supports a communications link and provides access to Intranet 114 in the same manner as the security server 101. This is typical of modern practice when corporate resources can be accessed internally as well as externally. The Intranet 114 is physically connected to the security server 101. If the user has successfully been granted access to the Intranet 114, the security server 101 prevents unauthorized intrusions into the protected resource. If the user is genuine and properly authenticated, access is granted to the protected resource 102 via proxy. Obviously, FIG. 2 does not illustrate all the potential network combinations that are possible in today's computing environment. For ease of reference, the term "client station" shall encompass not only the computer system which the user is currently accessing, but all the systems interposed between the client station 100 and the security server 101 (e.g., communications routers, firewalls, intranets).

It is typical that the computer systems, upon which run client station 100, security server 102, and protected resource 103 all run, are physically different computer systems separated by great distances. Although this arrangement is typical, the concept of the security server approach applies also even when the three foregoing processes are not running on physically different computer systems, or are not on computer systems separated by great distances. It will be appreciated, however, that the general context of this description relates to the typical arrangement just described.

The manner in which the computer systems communicate is treated herein at a high level, and the details are omitted for the sake of clarity. For more detailed information on such communications, reference may be made to *Data and Computer Communications* or to *Local Networks*, both by William Stallings, and both incorporated by reference in their entirety for their useful background information.

Processes (including client processes, security server processes, and applications server processes), on a practical level, are supplied as software on any one of a variety of media. Furthermore, the software actually is or is based on statements written in a programming language. Such programming language statements, when executed by a computer, cause the computer to act in accordance with the particular content of the statements, thereby causing the defined process to run in a predetermined manner. Furthermore, software may be provided in any number of forms including, but not limited to, original source code, assembly code, object code, machine language, compressed or encrypted versions of the foregoing, and any and all equivalents.

One knowledgeable in computer systems will appreciate that "media," or "computer-readable media," as used here, may include a diskette, a tape, a compact disc, an integrated circuit, a cartridge, a remote transmission via a communications circuit, or any other similar medium useable by computers. For example, to supply software that defines a process, the supplier might provide a diskette or might transmit the software in some form via satellite transmission, via a direct telephone link, or via the Internet.

Although such software instructions might be "written on" a diskette, "stored in" an integrated circuit, or "carried over" a communications circuit, it will be appreciated that, for the purposes of this discussion, the computer usable medium will be referred to as "bearing" the software. Thus, the term "bearing" is intended to encompass the above and all equivalent ways in which software may be associated with a computer usable medium.

For the sake of simplicity, therefore, the term "program product" is hereafter used to refer to a computer useable medium, as defined above, which bears software in any form.

Proxies

Referring again to FIG. 1, the input address of the security server 101 interfaces with the client station 100. The output address of the security server 101 is connected to the protected resource 102. A proxy definition, resident on the security server 101, specifies an exact correspondence between an output address of the security server 101, and the input address of the security server 101. Information contained in the proxy definition is determinative of how input address traffic is routed to specified output addresses. In addition, this information embedded in the proxy definition ensures that all elements contained in the proxy definition are respected.

Proxy definitions may have many elements relating to privacy, security, and access control, such as:
1. A symbolic proxy name.
2. An associated protocol such as FTP or HTTP.
3. An input address (e.g. TCP/IP) filter, which specifies addresses to be included or excluded in the connection.
4. Authentication, indicating that all users and/or data traffic between the client and the server are to be authenticated.
5. Encryption, indicating that all traffic between the client and the server is encrypted at source and decrypted at destination.
6. Compression, indicating that all traffic between the client and the server is compressed at source and restored (uncompressed) at destination.
7. Input address (address of the client station side of the security server).

8. Output address (address of the "protected" side of the security server, connected to the protected resource (s)).
9. Protected resource address (there may be several for any proxy).

Certificates

Table 1 lists the components of X.509 Version 3 public key certificade.

TABLE 1

X.509 Certificate

Certificate Version Number
Certificate Serial Number
Issuer's Distinguished Name Attributes
Not Before/Not After Validity Date/Times
Subject's Distinguished Name Attributes
Subject's Public Key Bits
Additional Attributes
Issuer's Digital Signature Bits The attribute type, value assertions comprising the certificate issuer's and subject's (owner's) distinguished names, validity data, and additional attributes can be used by a security server to control routing paths or to define the rules for separate security policy domains. For example, a hypothetical corporation might have three divisions each with their own protected server: Administration, Manufacturing, and Engineering. Access to the protected servers is through a security server. Administration staff could only access the Administration and Manufacturing servers to accomplish their management tasks. Engineering staff could only have access to the Manufacturing and Engineering servers. Manufacturing staff would only have access to the Manufacturing server.

The standard X.509 "Organizational Unit Name" attribute could be used to indicate where an employee works within our hypothetical corporation. For example, John Doe, who works in engineering, would have the distinguished name: Common Name=John Doe, Organizational Unit Name= Engineering, Organization Name=Hypo Corporation. Jane Doe, who works in the accounting office, would have the distinguished name: Common Name=Jane Doe, Organizational Unit Name=Administration, Organization Name= Hypo Corporation.

In our hypothetical corporation, the security server is separately connected to each protected server. The security server authenticates, regardless of their point of origin, all connection requests from employees. The employees' organizational unit name attribute value is used by the security server to determine the user's access permissions. For example, only employees with the "Engineering" organizational unit attribute value would be allowed to connect to the Engineering server.

A description of certificates and attributes is found in *Secure Electronic Commerce* by W. Ford and M. S. Baum. Attributes included in certificates include (but are not limited to) Common Name, Locality Name, State or Province Name, Organization Name, Organizational Unit name, Country Name, and Street Address.

Authentication Procedure

Figure 4:
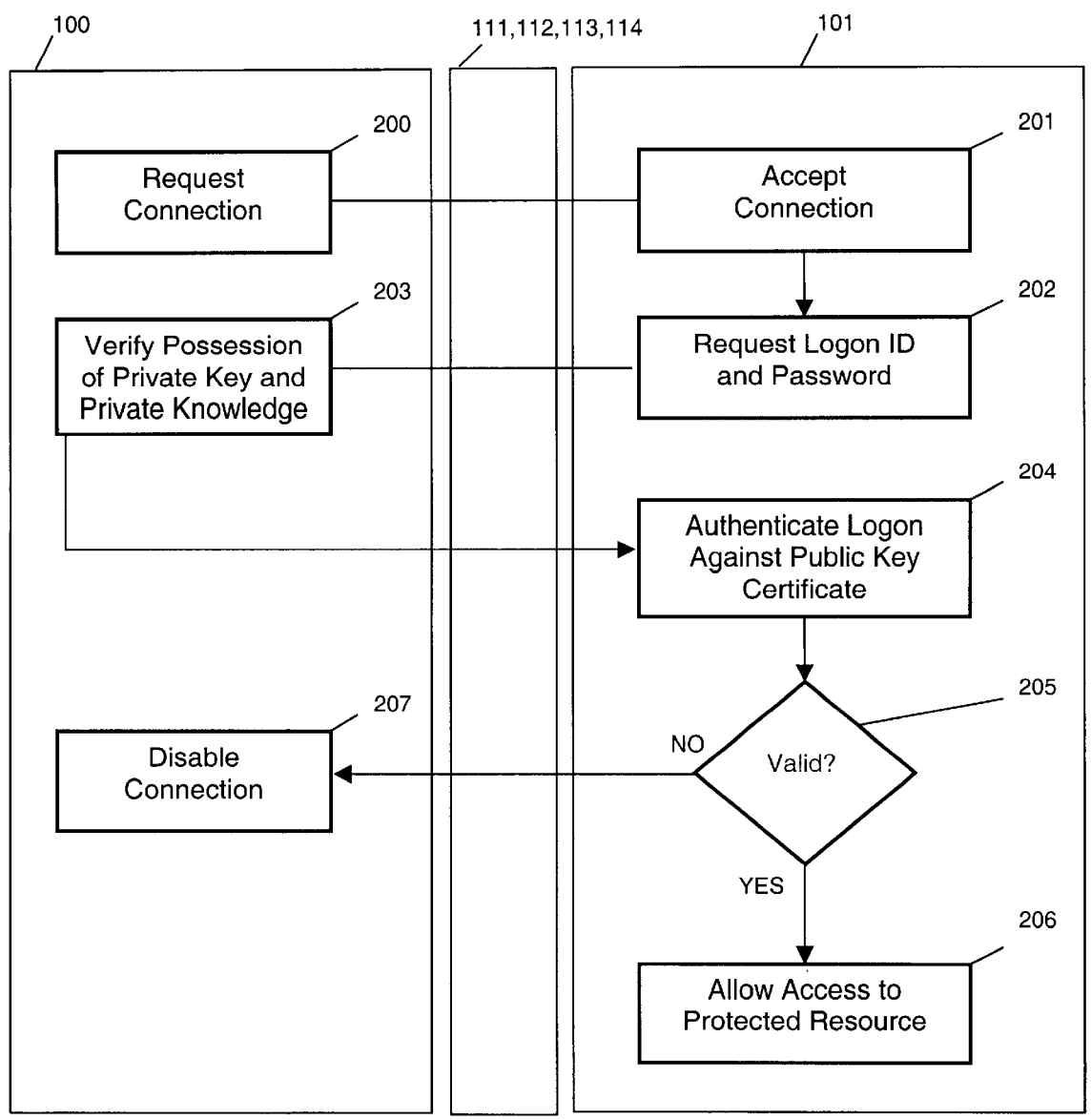
FIG. 4 illustrates a typical user login and authentication sequence between a security server and a client station with public and private keys.

FIG. 4 illustrates an authentication procedure used for PKI systems, reduced to high-level steps. This is a generalized procedure and is provided to show the user where in an authentication sequence the attribute filter would be used.

In first step 200, the client station 100 requests a connection to the advertised proxy address of the security server 101. Communications routers 111 and 112, the firewall 113 and the Intranet 114 are omitted from FIG. 4 for clarity's sake. As stated previously, the access request to the security server 101 could follow a multiplicity of paths.

In step 201, the security server 101 accepts the connection request from the client station 100. After acceptance of the connection request, in step 202 the security server transmits a request to the client station 100 for a login identification and password.

In step 203, the receipt of the login identification request from the security server 101 requires the client station 100 to determine if the user is the proper holder of the private key. The client station 100 must verify that the user is in possession of a private key and has the requisite knowledge to properly use that private key. If the user may properly use the private key, the client station 100 informs the security server 101 that the user has a private key and the knowledge to properly use that private key.

In step 204, the security server 101 authenticates the user's logon information against the user's public key certificate. The public key certificate is stored on the security server 101 or in a remote certificate repository. If the public key certificate is stored in a remote repository, the security server 101 retrieves the public key certificate prior to proceeding with the authentication procedure.

In step 205, the security server 101 makes a determination of whether the user should be validated. In step 206, if the user is validated, then access to a protected resource is granted. Otherwise, in step 207, the connection from the client station 100 is disabled as the user is not validated due to an authentication error.

Attribute Filter

In this invention, another element, known as an attribute filter, is added to the proxy definition. The purpose of the attribute filter is to control access through the security server 100 based on the value of a particular attribute in the user's public key certificate. The proxy definition used by the security server 100 consists of a set of the above-mentioned elements, one of which is the attribute filter definition. The attribute filter definition consists of a filter name and an "access expression." The attribute filter name can be hard-coded into the proxy definition, but at a cost of flexibility. The access expression is a Boolean expression (one notation for writing such expressions is "reverse polish notation" as defined in Internet RFC 1960. Other notations are possible).

Access through the security server 101 is granted to the protected resource 102 if the Boolean expression in the access expression evaluates true at the time of the connection request. An example of a simple Boolean expression for an attribute filter is "CN=Kelly." In this example, access to the protected resource 102 would be granted if the Common Name (CN) of the requestor attempting to establish a connection was "Kelly." The operation of the access expression of the attribute filter operation is not limited to true evaluations; access to the protected resource 102 could be denied if the access expression evaluates true.

Figure 5:
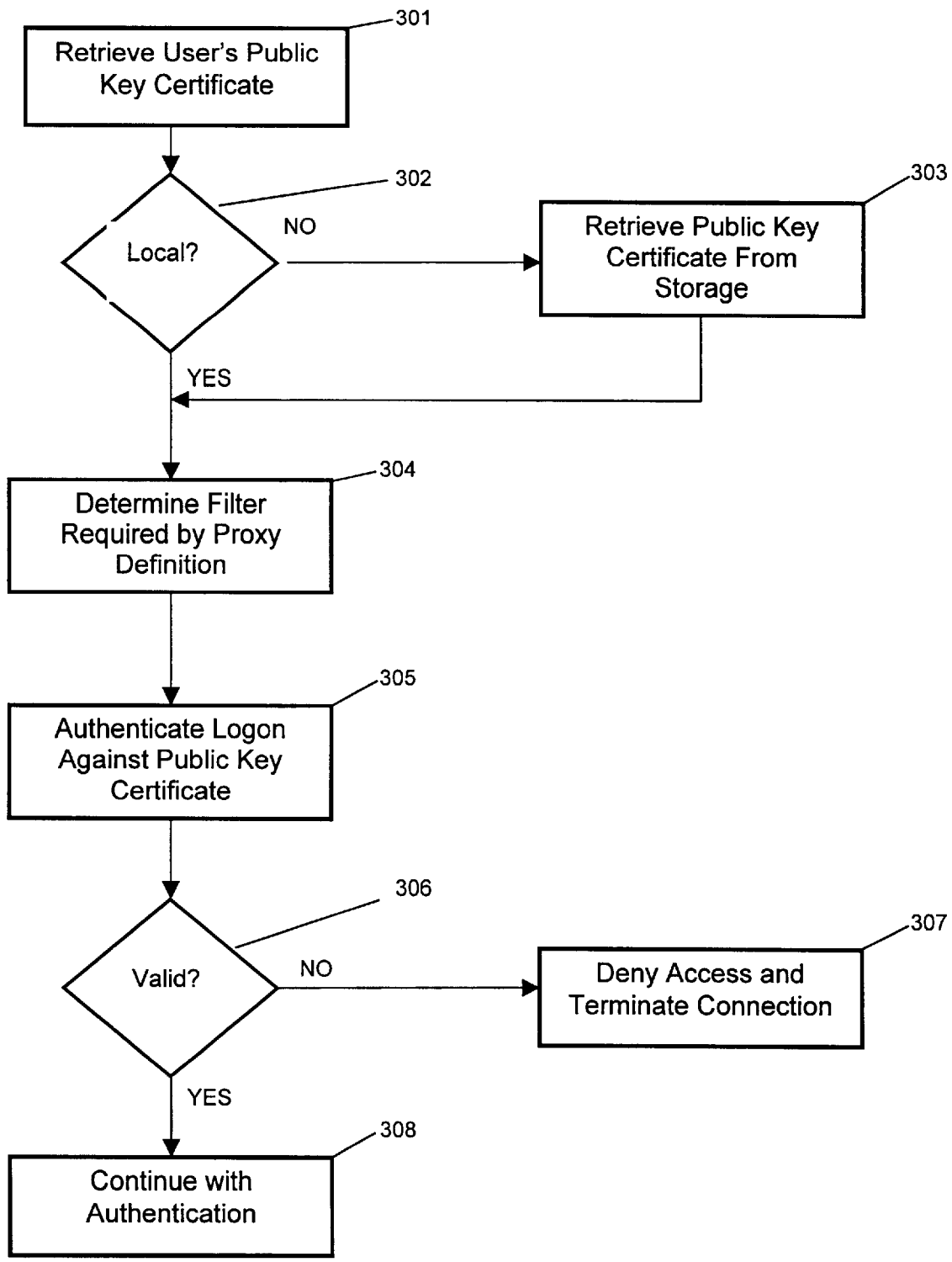
FIG. 5 illustrates the use of attributes within a public key certificate to control access to a protected resource.

FIG. 5 illustrates the high-level steps that the security server 101 will execute in evaluating the attributes contained within a public key certificate. In step 301, when the security server 101 server starts to authenticate a logon request (refer to step 204 of FIG. 4), it retrieves the public key certificate from storage. In step 302, the security server 101 determines if the public key certificate is stored locally or in a remote location. If stored remotely, step 303 is executed to retrieve the certificate from remote storage.

In step 304, once the public key certificate has been retrieved, the security server 101 evaluates the proxy definition requested by the client station 100. The security server 101 must determine which attribute filter is required by the proxy definition in use for the particular input/output addressing requested. As stated previously, the proxy definition contains a pointer to the appropriate attribute filter for a particular proxy definition.

In step 305, after determining the attribute filter specified by the proxy definition, the security server 101 uses the access expression within the attribute filter to evaluate the particular public key certificate attributes listed within the attribute filter. The access expression may be written in several different notations. It is not limited to using only Internet RFC 1960 notation.

In step 306, if the access expression evaluates true, then in step 308, the security server 101 grants access to the protected resource 102. Otherwise, if the access expression evaluates false, then in step 307, the security server 101 denies access to the protected resource 102. As stated previously, access may be denied when step 306 evaluates true, based on the initial setup of the attribute filter.

Input/Output Addresses

A further embodiment of use of the attribute filter is associated with the input address element or the output address element of the proxy definition. This association can be used to further limit access to a protected resource. If the attribute filter is associated with the input address (client side of the security server 101), and the access expression evaluates true, then access through the security server will be granted or denied to any protected resource 102 on the output address (protected side of the security server 101). Associating the attribute filter with the output address constrains access to protected resource 102. If the access expression evaluates true, access through the security server 101 will be granted or denied to the particular protected resource 102 at a specific protected server address on the output side of the proxy.

Figure 6:
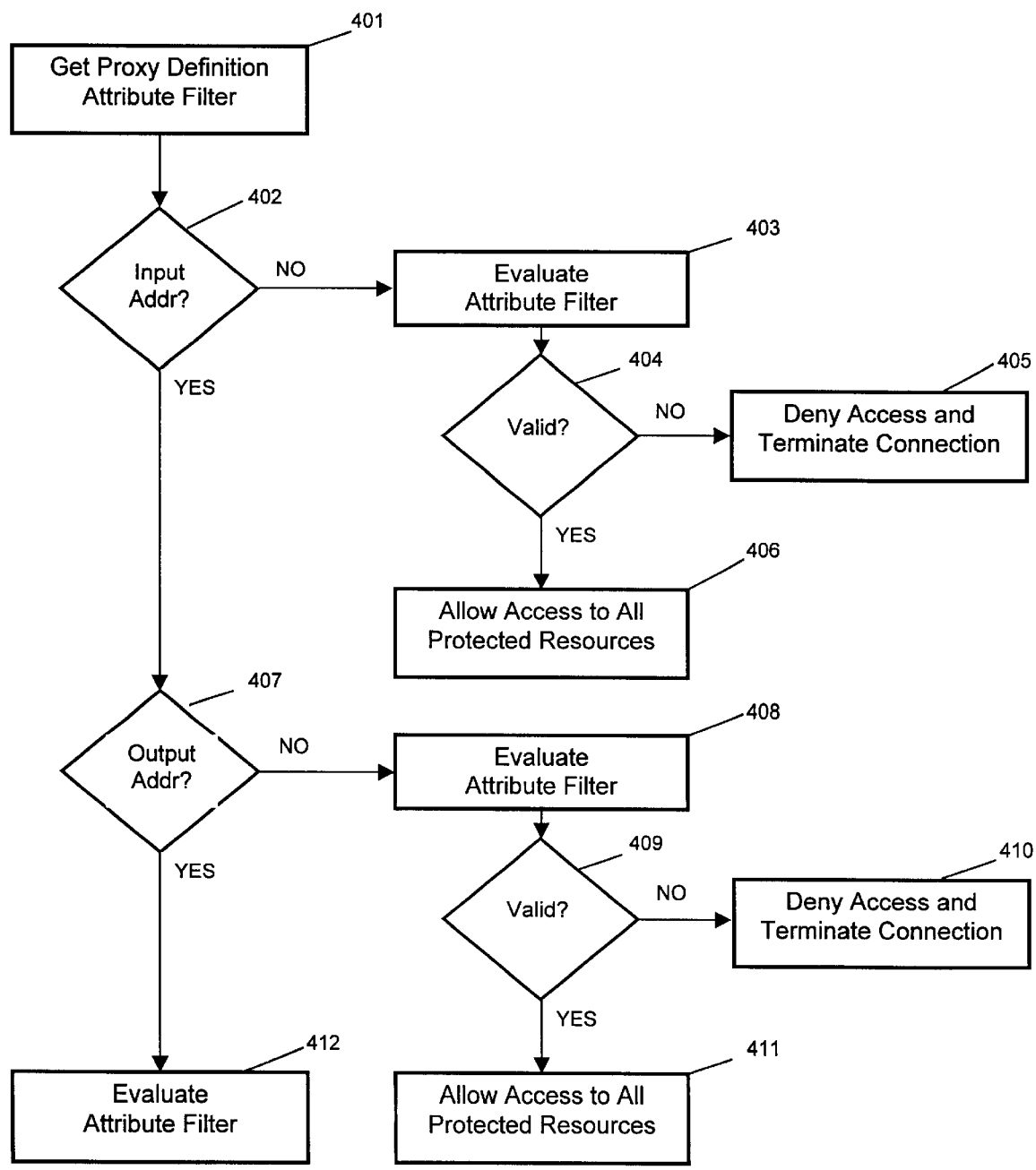
FIG. 6 illustrates the use of input and output attributes in a proxy definition to control access to a protected resource.

FIG. 6 has the high-level steps required for implement this access control. In step 401, after the public key certificate has been retrieved, the security server 101 determines which attribute filter is required by the proxy definition targeted for the particular input/output addressing.

In step 402, the security server 101 determines if the attribute filter has any association with the input address. In step 403, if the security server 101 finds an input address association, the attribute filter is reviewed to determine if it has an access expression requiring evaluation of public key certificate attributes. In step 404, the access expression is evaluated. In step 406, the security server 101 grants access to any protected resource 102 because the access expression evaluated true. Otherwise, in step 405, the security server 101 denies access because the access expression evaluated false. The security server 101 terminates the connection request.

In step 407, if the security server 101 determines the attribute filter has an association with the output address. a similar process is followed. Access is granted, however, only to a specific protected resource 102 at that output address.

In step 412, if the attribute filter has no association with either the input address or the output address, then the processing of the attribute filter proceeds as described previously.

Generalizations to other Embodiments

Although the invention has been described in terms of certain steps and protocol to be executed or carried out, it is to be understood that the invention resides in a computer system that operates according to the steps outlined above, and also in a program product bearing software for enabling a computer system to operate according to the steps outlined above.

In the drawing figures, the particular order of the steps in not always critical, and certain steps may be performed in parallel with other or in a different order.

Although certain embodiments have been described in detail, the invention is not to be construed as being limited to such embodiments, but in accordance with the appended claims and wherever public key certificate attributes can be used to an advantage.

REFERENCES

1. Secure Electronic Commerce, W. Ford and M. S. Baum, Prentice Hall PTR, 1997
2. Internet RFC 1960 "A String Representation of LDAP Search Filters."

I claim:

1. A method for server authentication of access requests to computer resources from a user at a client station, comprising:

storing at said server a certificate containing attributes associated with said user;

storing at said server an attribute filter;

computing at said server a computed value from said attributes in said certificate using said attribute filter;

determining at said server whether said computed value authenticates said user at said client station; and determining at said server whether said computed value grants or denies access to said computer resources.

2. A method for server authentication of access requests to computer resources from a user at a client station as set forth in claim 1, wherein said step of storing at said server said attribute filter includes:

determining the identification of said attribute filter;

selecting said user attributes from said certificate to use for access control to said computer resources; and determining the arithmetical sequence by which to evaluate said attributes.

3. A method for server authentication of access requests to computer resources from a user at a client station as set forth in claim 1, wherein said step of computing includes:

searching said server to retrieve said certificate;

searching a remote certificate depository if said certificate is not found on said server; and retrieval of said certificate when located.

4. A method for server authentication of access requests to computer resources from a user at a client station as set forth in claim 1, wherein said step of computing includes:

retrieval of attributes available for use in said certificate;

selecting said attributes in said certificate required by said attribute filter; and determining said computed value by evaluating said attribute filter.

5. A method for server authentication of access requests to computer resources from a user at a client station, comprising:

storing at said server a certificate containing attributes associated with said user;

storing at said server an attribute filter;

storing at said server a proxy definition;

computing at said server a computed value derived from said attributes in said certificate using said attribute filter;

determining at said server whether said computed value authenticates said user at said client station; and determining at said server whether said computed value grants or denies access to said computer resources.

6. A method for server authentication of access requests to computer resources from a user at a client station as set forth in claim 5, wherein said step of storing at said server an attribute filter includes:

determining attributes available for use in said certificate;

selecting said user attributes in said certificate to use in said certificate to control access to said computer resources; and determining the arithmetical sequence by which to evaluate said attributes.

7. A method for server authentication of access requests to computer resources from a user at a client station as set forth in claim 5, wherein said step of storing at said server a proxy definition includes adding a proxy definition element referencing said attribute filter.

8. A method for server authentication of access requests to computer resources from a user at a client station as set forth in claim 5, wherein said step of storing at said server a certificate containing attributes associated with said user includes:

searching said server to retrieve said certificate;

searching remote certificate depositories if said certificate is not found on said server; and retrieval of said certificate when located.

9. A method for server authentication of access requests to computer resources from a user at a client station as set forth in claim 5, wherein said step of computing includes:

retrieval of said attribute filter referenced by said proxy definition;

selecting said user attributes in said certificate required by said attribute filter; and determining said computed value by evaluating attribute filter.

10. A method for server authentication of access requests to computer resources from a user at a client station as set forth in claim 5, wherein said step of computing includes:

retrieval of said attribute filter referenced by said proxy definition;

selecting said user attributes in said certificate required by said attribute filter; and determining said computed value by evaluating selected attributes using said attribute filter and input address of said server.

11. A method for server authentication of access requests to computer resources from a user at a client station as set forth in claim 5, wherein said step of computing includes:

retrieval of said attribute filter referenced by said proxy definition;

selecting said user attributes in said certificate required by said attribute filter; and determining said computed value by evaluating selected attributes using said attribute filter and output address of said protected computer resource.

12. A computer system adapted for authentication of access requests to computer resources from a user at a client station, comprising:

a processor, and a memory including software instructions adapted to enable said computer system to perform the steps of:

storing at said computer system a certificate containing attributes associated with said user;

storing at said computer system an attribute filter;

computing at said computer system a computed value from said attributes in said certificate using said attribute filter;

determining at said computer system whether said computed value authenticates said user at said client station; and determining at said computer system whether said computed value grants or denies access to said computer resources.

13. A computer system adapted for authentication of access requests to computer resources from a user at a client station as set forth in claim 12, wherein said memory further includes software instructions adapted to enable the computer system to further perform the steps of:

determining the identification of said attribute filter;

selecting said user attributes from said certificate to use for access control to said computer resources; and determining the arithmetical sequence by which to evaluate said attributes.

14. A computer system adapted to authentication of access requests to computer resources from a user at a client station as set forth in claim 12, wherein said memory further includes software instructions adapted to enable the computer system to further perform the steps of:

searching said computer system to retrieve said certificate;

searching a remote certificate depository if said certificate is not found on said computer system; and retrieval of said certificate when located.

15. A computer system adapted to authentication of access requests to computer resources from a user at a client station as set forth in claim 12, wherein said memory further includes software instructions adapted to enable the computer system to further perform the steps of:

retrieval of attributes available for use in said certificate;

selecting said attributes in said certificate required by said attribute filter; and determining said computed value by evaluating said attribute filter.

16. A computer system adapted for authentication of access requests to computer resources from a user at a client station, comprising:

a processor, and a memory including software instructions adapted to enable said computer system to perform the steps of:

storing at said computer system a certificate containing attributes associated with said user;

storing at said computer system an attribute filter;

storing at said computer system a proxy definition;

computing at said computer system a computed value from said attributes in said certificate using said attribute filter;

determining at said computer system whether said computed value authenticates said user at said client station; and determining at said computer system whether said computed value grants or denies access to said computer resources.

17. A computer system adapted to authentication of access requests to computer resources from a user at a client station as set forth in claim 16, wherein said memory further includes software instructions adapted to enable the computer system to further perform the step of storing at said computer system an attribute filter so as to include:

determining attributes available for use in said certificate;

selecting said attributes in said certificate to use in said certificate to control access to said computer resources; and determining the arithmetical sequence by which to evaluate said attributes.

18. A computer system adapted to authentication of access requests to computer resources from a user at a client station as set forth in claim 16, wherein said memory further includes software instructions adapted to enable the computer system to further perform the step of storing a proxy definition so as to include adding a proxy definition element referencing said attribute filter.

19. A computer system adapted to authentication of access requests to computer resources from a user at a client station as set forth in claim 16, wherein said memory further includes software instructions adapted to enable the computer system to further perform the step of storing at said computer system a certificate containing attributes associated with said user so as to include:

searching said computer system to retrieve said certificate;

searching remote certificate depositories if said certificate is not found on said computer system; and retrieval of said certificate when located.

20. A computer system adapted to authentication of access requests to computer resources from a user at a client station as set forth in claim 16, wherein said memory further includes software instructions adapted to enable the computer system to further perform the step of computing so as to include:

retrieval of said attribute filter referenced by said proxy definition;

selecting said user attributes in said certificate required by said attribute filter; and determining said computed value by evaluating attribute filter.

21. A computer system adapted to authentication of access requests to computer resources from a user at a client station as set forth in claim 16, wherein said memory further includes software instructions adapted to enable the computer system to further perform the step of computing so as to include:

retrieval of said attribute filter referenced by said proxy definition;

selecting said user attributes in said certificate required by said attribute filter; and determining said computed value by evaluating selected attributes using said attribute filter and input address of said computer system.

22. A computer system adapted to authentication of access requests to computer resources from a user at a client station as set forth in claim 16, wherein said memory further includes software instructions adapted to enable the computer system to further perform the step of computing so as to include:

retrieval of said attribute filter referenced by said proxy definition;

selecting said attributes in said certificate required by said attribute filter; and determining said computed value by evaluating selected attributes using said attribute filter and output address of said protected resource.

23. A computer program product for enabling a computer to authenticate access requests to computer resources from a user at a client station, comprising:

software instructions for enabling the computer to perform predetermined operations, and a computer readable medium bearing the software instructions;

said predetermined operations including the steps of:

storing at said computer a certificate containing attributes associated with said user;

storing at said computer an attribute filter;

computing at said computer a computed value from said attributes in said certificate using said attribute filter;

determining at said computer whether said computed value authenticates said user at said client station;

determining at said computer whether said computed value grants or denies access to said computer resources.

24. The computer program product for enabling a computer to authenticate access requests to computer resources from a user at a client station according to claim 23, wherein:

the step of storing at said computer an attribute filter includes:

determining the identification of said attribute filter;

selecting said user attributes from said certificate to use for access control to said computer resources;

determining the arithmetical sequence by which to evaluate said attributes.

25. The computer program product for enabling a computer to enabling to authenticate access requests to computer resources from a user at a client station according to claim 23, wherein:

the step of storing at said computer a certificate containing attributes associated with said user includes:

searching said computer to retrieve said certificate;

searching a remote certificate depository if said certificate is not found on said computer, and retrieval of said certificate when located.

26. The computer program product for enabling a computer to enabling to authenticate access requests to computer resources from a user at a client station according to claim 23, wherein:

the step of computing at said computer a computed value from said attributes in said certificate using said attribute filter includes:

retrieval of attributes available for use in said certificate;

selecting said attributes in said certificate required by said attribute filter;

determining said computed value by evaluating said attribute filter.

27. A computer program product for enabling a computer to authenticate access requests to computer resources from a user at a client station, comprising:

software instructions for enabling the computer to perform predetermined operations, and a computer readable medium bearing the software instructions;

said predetermined operations including the steps of:

storing at said computer a certificate containing attributes associated with said user;

storing at said computer an attribute filter;

storing at said computer a proxy definition;

computing at said computer a computed value derived from said attributes in said certificate using said attribute filter;

determining at said computer whether said computed value authenticates said user at said client station;

determining at said computer whether said computed value grants or denies access to said computer resources.

28. The computer program product for enabling a computer to enabling to authenticate access requests to computer resources from a user at a client station according to claim 27, wherein:

the step of storing at said computer an attribute filter includes:

determining attributes available for use in said certificate;

selecting said attributes in said certificate to use in said certificate to control access to said computer resources;

determining the arithmetical sequence by which to evaluate said attributes.

29. The computer program product for enabling a computer to enabling to authenticate access requests to computer resources from a user at a client station according to claim 27, wherein:

the step of storing at said computer a proxy definition includes adding a proxy definition element referencing said attribute filter.

30. The computer program product for enabling a computer to enabling to authenticate access requests to computer resources from a user at a client station according to claim 27, wherein:

the step of storing at said computer a certificate containing attributes associated with said user includes:

searching said computer to retrieve said certificate;

searching remote certificate depositories if said certificate is not found on said computer, and retrieval of said certificate when located.

31. The computer program product for enabling a computer to enabling to authenticate access requests to computer resources from a user at a client station according to claim 27, wherein:

the step of computing at said computer a computed value derived from said attributes in said certificate using said attribute filter includes:

retrieval of said attribute filter referenced by said proxy definition;

selecting said user attributes in said certificate required by said attribute filter;

determining said computed value by evaluating attribute filter.

32. The computer program product for enabling a computer to enabling to authenticate access requests to computer resources from a user at a client station according to claim 27, wherein:

the step of computing at said computer a computed value derived from said attributes in said certificate using said attribute filter includes:

retrieval of said attribute filter referenced by said proxy definition;

selecting said attributes in said certificate required by said attribute filter;

determining said computed value by evaluating selected attributes using said attribute filter and input address of said computer.

33. The computer program product for enabling a computer to enabling to authenticate access requests to computer resources from a user at a client station according to claim 27, wherein:

the step of computing at said computer a computed value derived from said attributes in said certificate using said attribute filter includes:

selecting said attributes in said certificate required by said attribute filter;

determining said computed value by evaluating selected attributes using said attribute filter and output address of said protected resource.

* * * * *